(12) United States Patent
Khoo et al.

(10) Patent No.: US 9,578,578 B2
(45) Date of Patent: Feb. 21, 2017

(54) APPARATUS AND METHOD FOR ENABLING EFFICIENT HANDOVER OF A RECEIVING RADIO BETWEEN RADIO FREQUENCY SITES

(71) Applicant: MOTOROLA SOLUTIONS, INC, Schaumburg, IL (US)

(72) Inventors: Hun Weng Khoo, Gelugor (MY); Dipendra M Chowdhary, Hoffman Estates, IL (US); Yueh Ching Chung, Georgetown (MY); Chebron Padmanaba, Bayan Lepas (MY); Satyanarayan R Panpaliya, Palatine, IL (US); Badarinath Patibandla, Schaumburg, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 221 days.

(21) Appl. No.: 14/106,530

(22) Filed: Dec. 13, 2013

(65) Prior Publication Data

US 2015/0172989 A1   Jun. 18, 2015

(51) Int. Cl.
*H04W 36/30* (2009.01)
*H04J 3/16* (2006.01)
(Continued)

(52) U.S. Cl.
CPC ............... *H04W 36/30* (2013.01); *H04J 3/16* (2013.01); *H04W 36/0061* (2013.01);
(Continued)

(58) Field of Classification Search
CPC  H04J 14/0283; H04J 14/0295; H04Q 11/0062
See application file for complete search history.

(56) References Cited

U.S. PATENT DOCUMENTS 4,939,746 A    7/1990  Childress
5,454,026 A *  9/1995  Tanaka .......................... 455/437
(Continued)

FOREIGN PATENT DOCUMENTS

EP    0676117 B1    5/2004
EP    2555463 A2    2/2013

OTHER PUBLICATIONS

PCT International Search Report Dated Mar. 16, 2015 for Counterpart Application PCT/US2014/067235.
(Continued)

*Primary Examiner* — Chandrahas Patel

(57) ABSTRACT

A radio receives audio information on a first traffic channel in a radio frequency (RF) site. The radio receives, on the first traffic channel, an announcement of alternative traffic channels on which the audio information is also transmitted in adjacent RF sites. The radio determines signal strength indicators for the alternative traffic channels in the adjacent RF sites while continuing to receive the audio information on the first traffic channel. The radio determines that a signal strength associated with the first traffic channel is below a first threshold. Based on the determination and as a function of the scanning, the radio roams to a second traffic channel, selected from the alternative traffic channels, in an adjacent RF site where a signal strength associated with the second traffic channel is above a second threshold. The radio receives the audio information via the second traffic channel.

20 Claims, 6 Drawing Sheets

(51) Int. Cl.
*H04W 56/00* (2009.01)
*H04W 36/00* (2009.01)
*H04W 36/02* (2009.01)
*H04W 36/36* (2009.01)

(52) U.S. Cl.
CPC ......... *H04W 36/026* (2013.01); *H04W 36/36* (2013.01); *H04W 56/00* (2013.01)

(56) References Cited

U.S. PATENT DOCUMENTS

| | | |
|---|---|---|
| 5,475,683 A | 12/1995 | Harrison et al. |
| 8,014,778 B2 | 9/2011 | Marque-Pucheu et al. |
| 2007/0268859 A1 | 11/2007 | Yao et al. |
| 2008/0186943 A1 | 8/2008 | Wiatrowski et al. |

OTHER PUBLICATIONS

"Electromagnetic Compatibility and Radio Spectrum Matters (ERM); Digital Mobile Radio (DMR) Systems; Part 1: DRM Air Interface (A1) Protocol; ETSI TS 102 361-1", IEEE, LIS, Sophia Antipolis Cedex, France, vol. ERM-TG-DMR, No. V1.4.5, Dec. 1, 2007, XP014040497, ISSN: 0000-0001, Paragraphs 7.2 and 7.3, Figures 7.8 and 7.10.

"Electromagnetic Compatibility and Radio Spectrum Matters (ERM); Digital Mobile Radio (DMR) Systems; Part 4: DRM Trunking Protocol"; Technical Specification, European Telecommunications Standards Institute (ETSI), Sophia Antipolis ; France vol. ERM-TG-DMR, No. V1.5.1, Feb. 1, 2013, XP014156319, Paragraphs 6.7.1.3.

\* cited by examiner

APPARATUS AND METHOD FOR ENABLING EFFICIENT HANDOVER OF A RECEIVING RADIO BETWEEN RADIO FREQUENCY SITES

BACKGROUND OF THE INVENTION

Two-way radio communications standards, for example, those outlined in the Digital Mobile Radio (DMR) standards, establish protocols and other system requirements for communications. The DMR standard, for example, supports simultaneous and independent calls on a single radio channel. In particular, according to the standard, a 12.5 Kilohertz (kHz) bandwidth radio channel is divided into two alternating timeslots. Each timeslot acts as a separate communications path such that the radios may communicate on an assigned timeslot according to, for example, a Time Division Multiple Access (TDMA) access scheme. The DMR standard also provides a control channel which coordinates radios activities in a repeater mode (i.e., a mode where information is sent from a transmitting radio through a repeater to one or more receiving radios). Therefore, when the radios are operating in the repeater mode, two different non-interfering calls can be simultaneously supported on the two TDMA timeslots of a radio frequency (RF) channel.

In a trunked radio system, to avoid interference between radios transmitting on the same RF channel, each radio receives channel information from the control channel which coordinates RF channel activities. In addition, the radios may also implement a roaming feature. The roaming feature allows the radio to look for activities on multiple channels configured in the radio's unique roaming list, according to a predetermined sequence. While roaming, the radio monitors the frequencies and timeslots of the channels configured in the radio's unique roaming list. As a radio receives audio during a call, the radio may roam from one RF site to another if the call signal is degraded and/or falls below a predefined threshold, causing an audio hole wherein the receiving radio may not receive the full audio signal. In such a case using, for example, the DMR protocol, after waiting for a predefined time period, for example, 720 milliseconds (ms), if the call signal does not improve on the current traffic channel being used by the receiving radio (also referred to as a first traffic channel), the receiving radio samples the control channels of adjacent RF sites in order to find an alternative traffic channel (referred to as a second traffic channel), on an adjacent RF site, with sufficient signal strength that is also being used for the call. The receiving radio selects the control channel of adjacent RF sites which has the best and sufficient signal strength.

The radio then moves to the selected control channel and confirms the movement to the selected control channel by examining the site identifier and system identifier being broadcasted on the selected control channel. The receiving radio may take approximately 100 ms to switch to the control channel in the adjacent RF site and 60 ms to decode information. The receiving radio then optionally registers with the adjacent RF site. Thereafter, the receiving radio waits for an announcement from the selected control channel with the second traffic channel information. The announcement from the control channel may be delayed depending on the number of channels being served by the control channel and whether or not other announcements have higher priority. For example, if the announcement from the control channel takes 60 ms and the control channel is serving 10 channels, the receiving radio may have to wait up to 540 ms before it can receive the announcement with the second traffic channel information, assuming that no higher priority announcements need to be sent by the control channel. Thereafter, the receiving radio may move to the announced traffic channel (i.e., the second traffic channel) and synchronize with the second traffic channel in order to continue receiving the audio. The receiving radio may take approximately 100 ms to switch to the second traffic channel and another 390 ms to synchronize with the traffic channel. The total time required for all steps in the roaming process makes handover of the receiving radio between adjacent RF sites inefficient and may create noticeable audio holes during calls.

Accordingly, there is a need for a method and apparatus for enabling more efficient handover of a receiving radio between RF sites.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
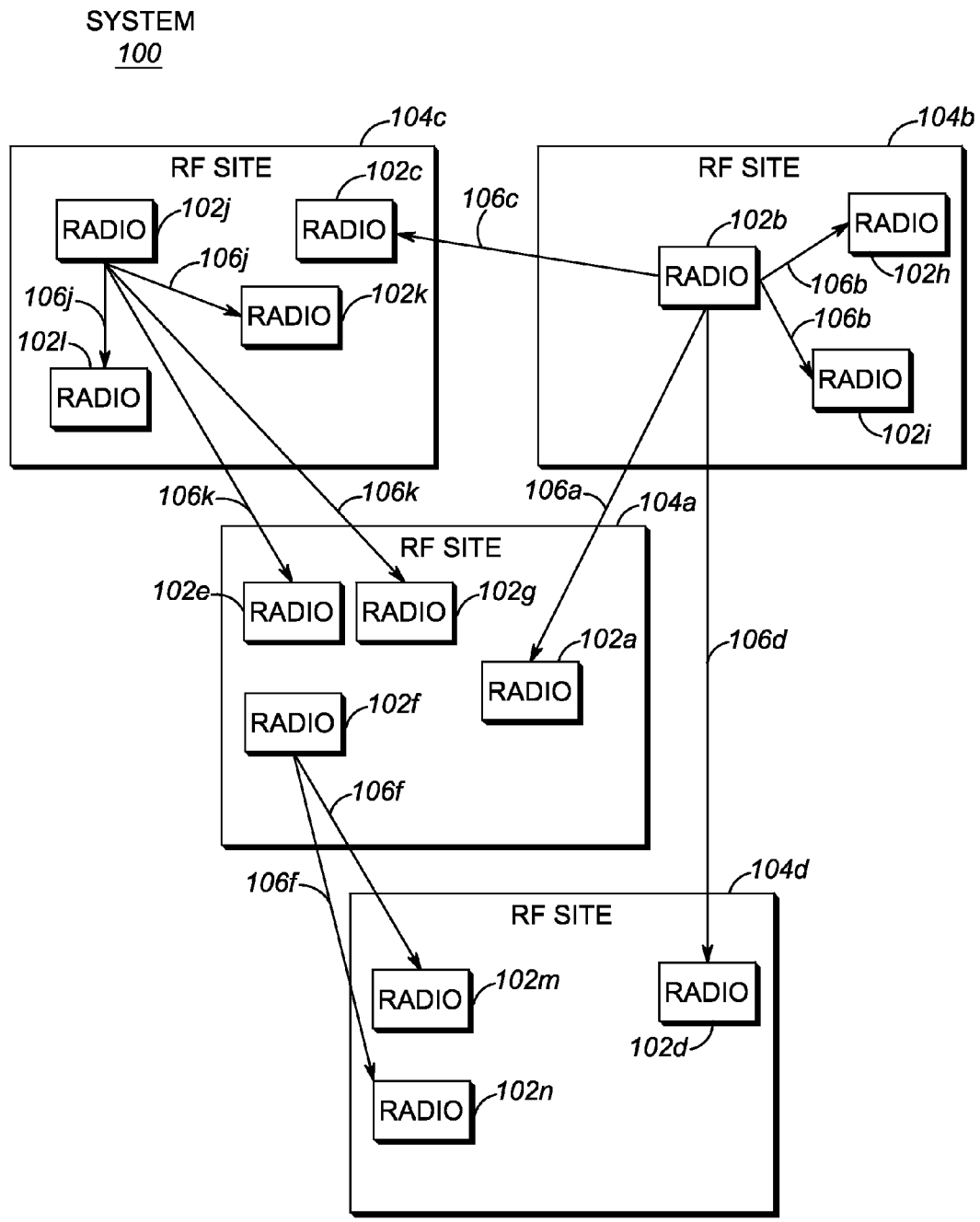
FIG. 1 is a block diagram of a system used in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some embodiments are directed to apparatuses and methods where a radio receives audio information of a call on a first traffic channel in a radio frequency (RF) site. The radio receives, on the first traffic channel, an announcement of alternative traffic channels in adjacent RF sites on which the audio information is also being transmitted. The radio scans signal strength indicators for the alternative traffic channels in the adjacent RF sites while continuing to receive the audio information on the first traffic channel. The radio determines that a signal strength associated with the first traffic channel is below a first threshold. Based on the determination and as a function of the scanning, the radio roams to a second traffic channel, selected from the alternative traffic channels, in an adjacent RF site where a signal strength associated with the second traffic channel is above a second threshold. The radio receives the audio information of the call via the second traffic channel. In an embodiment, the first threshold may be, for example, −99 decibel milliwatt (dBm) and the second threshold may be, for example, −93 dBm.

FIG. 1 is a block diagram of a system used in accordance with some embodiments. System 100 includes one or more operating radios 102 (i.e., radios 102a-102n) configured to communicate with each other in a direct mode and/or in a repeater mode. Radios 102 may be, for example, portable two-way radios or mobile radios that can be connected directly or via a repeater (not shown). Each radio 102 may receive, monitor, and/or transmit information during an assigned timeslot according to, for example, a Time Division Multiple Access (TDMA) access scheme, although other access schemes may be used. FIG. 1 shows radios 102b, 102f and 102j sending call information to multiple radios in different radio frequency (RF) sites 104a-104d.

Radio 102b, for example, is sending a group call to radios 102a, 102c, 102d and 102h-102i in adjacent radio frequency (RF) sites. Each RF site has a specific channel (frequency and timeslot) associated with the call. When the radios 102 operate in the repeater mode in a trunked system, each receiving radio (for example, radios 102a, 102c, 102d and 102h-102i receiving the call from radio 102b) is provisioned with a list of adjacent RF sites. The radios may also learn about adjacent RF sites from broadcast control channel information sent from the current RF control channel in a current RF site. Accordingly when the radios are provisioned with the list of adjacent RF sites, radio 102a, for example, is provisioned with a list including RF sites 104b-104d. If there is degradation in the call signal for a predefined time period, the receiving radio may be handed over from a first traffic channel in the current RF site where the radio is operating to a second traffic channel in an adjacent RF site. For example, while radio 102a is receiving the call from radio 102b on traffic channel 106a in RF site 104a (also referred to as the first traffic channel), radio 102a may also learn about alternative traffic channels 106b-106d in adjacent sites 104b-104d that are also being used for the call. The announcements of the alternative traffic channels 106b-106d may be transmitted in one or more embedded link control messages that are typically sent with voice calls. By sending the announcement in embedded link control messages, the audio being received by radio 102a will not be further impacted. Additionally or alternatively, the system may broadcast the announcement in a traffic channel message (CSBK) during call hang-time. The CSBK broadcast and embedded link control messages may include a channel identifier, slot identifier and delay for traffic channels 106b-106d that are also being used for the call. Although the controller knows of the adjacent and non-adjacent sites that the call is occurring on, the controller announces only information regarding the adjacent sites broadcasting the call on a traffic channel in the CSBK broadcast and/or the embedded link control messages sent to a particular site.

Subsequent to receiving the announcement, while radio 102a is receiving the voice call on traffic channel 106a, radio 102a may also scan and determine received signal strength indicator (RSSI) values for traffic channels 106b-106d and identify those of traffic channels 106b-106d where the RSSI is at or above an acceptable level. An acceptable level may be defined as a "step" dB increase from a first threshold (for example, −99 dBm), where the "step" may be a preconfigured value, for example, 6 dB. In some embodiments, radio 102a may identify traffic channels 106b-106d where the RSSI is above a preconfigured threshold (for example, −90 dBm). Radio 102a may scan traffic channels 106b-106d during an off-timeslot (i.e., the timeslot during which the radio is not receiving audio in a TDMA system). Accordingly, rather than scanning the control channels in adjacent RF sites 104b-104d during the off-timeslot, radio 102a scans the announced traffic channels 106b-106d in the adjacent RF sites 104b-104d during the off-timeslot. Thereafter, when radio 102a decides to roam, for example, to adjacent RF site 104c while radio 102a is still receiving the call from radio 102b, radio 102a will already know the traffic channel in RF site 104c assigned to the call and radio 102a may go directly to traffic channel 106c (referred to as the second traffic channel) without going through a control channel for RF site 104c and waiting for traffic channel announcements on the control channel. To optimize the time for moving from first traffic channel 106a to second traffic channel 106c and synchronize with traffic channel 106c, radio 102a may time its movement to traffic channel 106c using delay information.

For example, in an embodiment, a repeater at each adjacent RF site may broadcast its site delay information and the delay information of adjacent RF sites relative to an RF site from which the transmission originates (referred to as a transmission originating site). Using the example where RF sites 104a-104d are adjacent RF sites, the delay information for each RF site relative to the originating site may be broadcasted in multiples of time unit (e.g. multiples of 30 ms). When the repeater for RF site 104a sends its delay information and the delay information for the adjacent RF sites in an embedded link control packet, the repeater for RF site 104a may broadcast its information as being delayed by 0 ms if it is the originating site, the information for a first adjacent site as being delayed by 60 ms, the information for a second adjacent site as being delayed by 120 ms, and the information for a third adjacent site as being delayed by 180 ms. The delay between the sites may be computed by using various known techniques and is not disclosed in detail here. As an alternative to broadcasting delay information, the delay information of adjacent sites may also be computed with reference to each particular site that has to broadcast the delay information.

With this approach, system 100 reduces the time required for radio 102a to receive the announcement of traffic channels 106b-106d as the announcement may be embedded into the call. Furthermore, the time required for moving to the control channel and confirming the movement is eliminated as the radio no longer is required to move to the control channel and register in order to identify the second traffic channel during roaming. After the call is over, radio 102a may have to return to the control channel of RF site 102c to obtain, for example, the control channel frequency. To provide radio 102a with the control channel information, during the call, the traffic channel 106c announces its site ID using common announcement channel (CACH) information. Radio 102a may therefore obtain the site id for RF site 104c by monitoring the CACH information and obtain the control channel information using the site ID. After the call ends, radio 102a may register with the control channel of RF site 104c.

Figure 2:
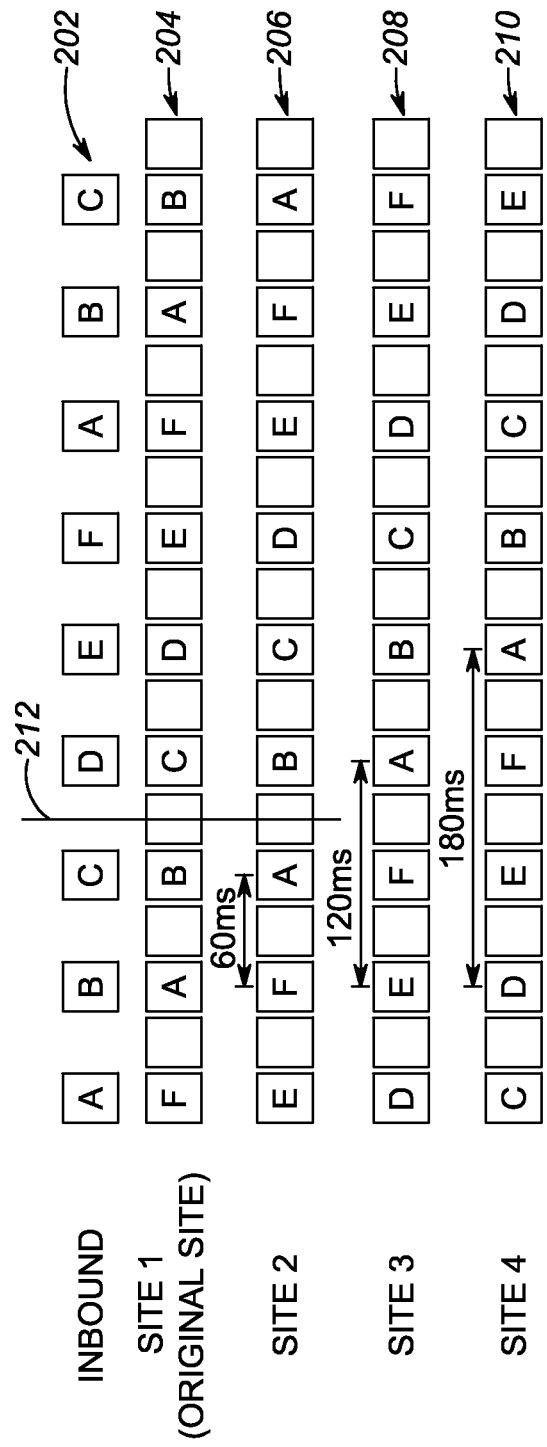
FIG. 2 is a block diagram of how delay information is determined in accordance with some embodiments.

FIG. 2 is a block diagram example of how delay information is determined in accordance with some embodiments. Label 202 shows that radio 102a, for example, is transmitting the blocks labeled A-F. Label 204 shows that radio 102f, for example, is to receive the blocks in RF Site 104a. Labels 206-210 show how the information is received in each of RF sites 104b, 104c, and 104d, respectively. The delay information is defined as the delay of each adjacent RF site relative to the calling site (i.e., the transmission originating site). The repeater for RF site 104a broadcasts its information as being delayed by 0 ms (as shown in 204), the information for a first adjacent site (RF site 104b) as being delayed by 60 ms (as shown in 206), the information for a second adjacent site (RF site 104c) as being delayed by 120 ms (as shown in 208), and the information for a third adjacent site (RF site 104d) as being delayed by 180 ms (as shown in 210). The delay values provided here are used to illustrate the concept. Other values are possible in actual usage scenarios. Radio 102a uses the information from the link control packet to determine when to switch to other adjacent traffic channels for the call, such as traffic channel 106c, for example. Radio 102a may determine the time difference between its home site (i.e., RF site 104a) and a target site (i.e., RF site 104c) from the delay information obtained from the broadcast link control message. If radio 102a is to switch from RF site 104a to RF site 104c before the first A block in 208, radio 102a may switch to RF site 104c just before A block in 208, as shown by the line 212.

Figure 3:
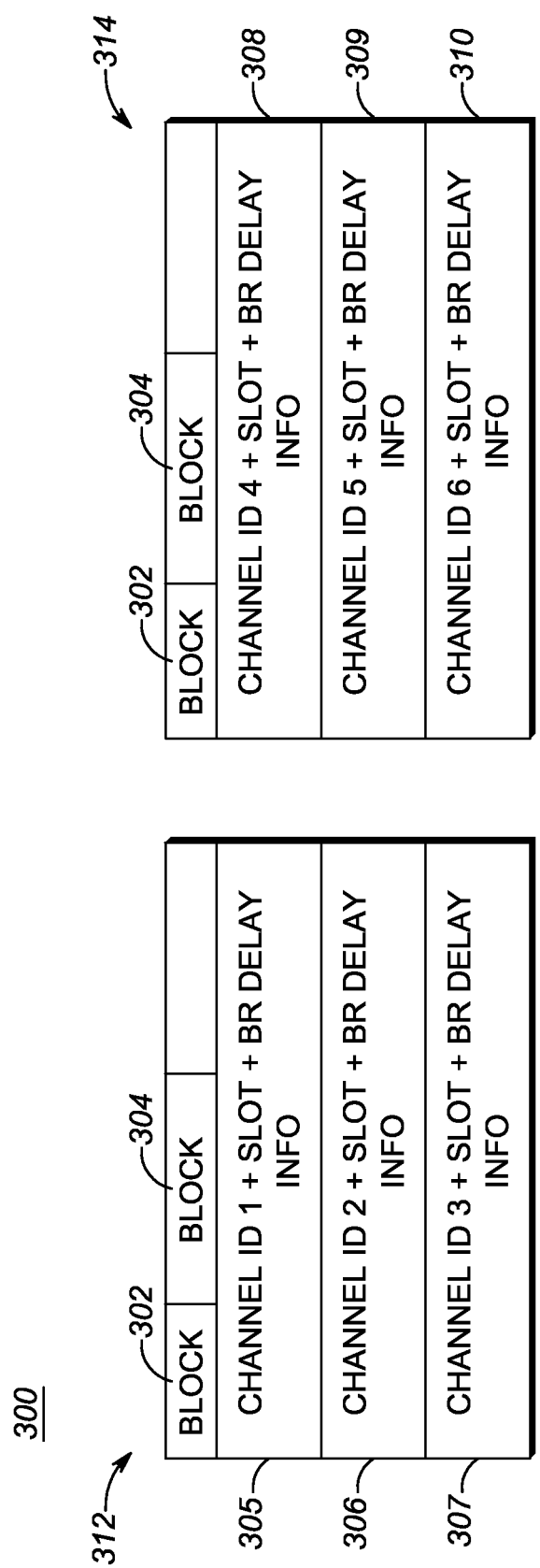
FIG. 3 is a block diagram of an embedded link control message used in accordance with some embodiments.

FIG. 3 is a block diagram of an embedded link control message used in accordance with some embodiments. Message 300 includes two embedded link control bursts 312 and 314, each including block 302 with a first or last bit to indicate whether it is the first or last link control burst. Link control bursts 312 and 314 also include blocks 304-310 with the RF site delay information, the channel identifier (for example, the frequency) and the timeslot (for example, timeslot 1 or 2) for a traffic channel transmitting the same audio on an adjacent RF site. Blocks 304, in each of link control bursts 312 and 314, are shown to announce the delay information for the home RF site. Each of blocks 305-310 are shown to announce the channel ID, the time slot and the delay information for an RF site associated with the channel ID announced in that block. In an embodiment, system 100 may announce up to six adjacent channels in embedded link control bursts 312 and 314. It should be apparent to one skilled in the art that all of the fields of embedded link control message 300 are not shown for the sake of simplicity. Only those fields that are useful in describing the announcement message are shown.

Figure 4:
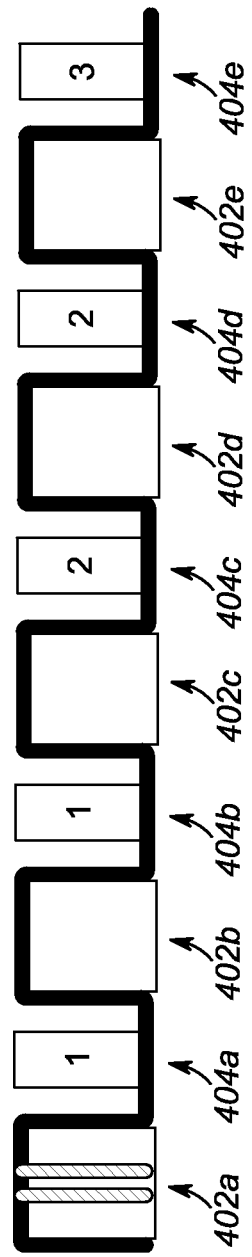
FIG. 4 is a block diagram of sampling performed in accordance with some embodiments.

FIG. 4 is a block diagram of sampling performed in accordance with some embodiments. Consider that a radio is receiving audio in timeslot 1 402 and determining the RSSIs of alternative adjacent traffic channels in adjacent RF sites in timeslot 2 404. At slots 402a-402e, the radio receives audio in timeslot 1 402. At slot 404a, the radio switches to a first adjacent RF site traffic channel frequency, measures the RSSI at the first adjacent RF site and returns to the ongoing call in slot 402b. In some situations measuring the RSSI of an adjacent RF site may take more time than that provided in a single slot. For example, measuring RSSI may take up to 25 ms for a weak signal. Due to the frequency change, the radio may split the RSSI sampling into two or more subsequent off-timeslots, if required. Accordingly, if required at slot 404b, the radio may return to the first adjacent RF site traffic channel frequency to continue to measure the adjacent traffic channel RSSI at the first adjacent RF site and returns to the ongoing call in slot 402c. At slot 404c, the radio switches to a second adjacent RF site traffic channel frequency, measures the RSSI at the second adjacent RF site and returns to the ongoing call in slot 402d, and so on. Note that in FIG. 4, the number 1 in slots 404a-404b indicates that the radio is measuring the RSSI of the first adjacent RF site traffic channel in those off-time slots, the number 2 in slots 404c-404d indicates that the radio is measuring the RSSI of the second adjacent RF site traffic channel in those off-time slots, and the number 3 in slot 404e indicates that the radio is measuring the RSSI of the third adjacent RF site traffic channel in that off-time slot.

Figure 5:
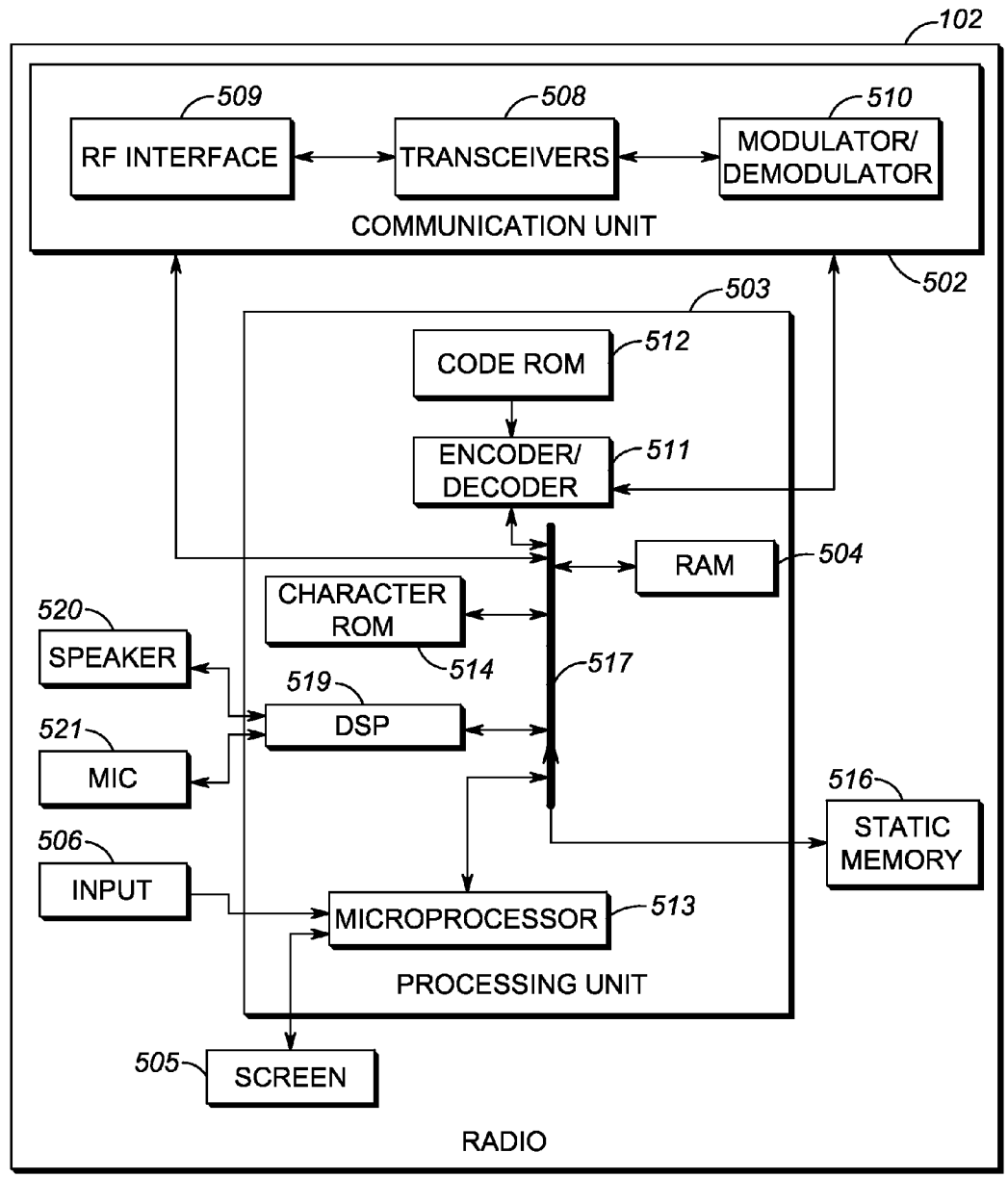
FIG. 5 is a block diagram of a radio used in accordance with some embodiments.

FIG. 5 is a block diagram of a radio used in accordance with some embodiments. Radio 102 includes a communications unit 502 coupled to a common data and address bus 517 of a processing unit 503. Radio 102 may also include an input unit (e.g., keypad, pointing device, etc.) 506, an output transducer unit (e.g., speaker) 520, an input transducer unit (e.g., a microphone) (MIC) 521, and a display screen 505, each coupled to be in communication with the processing unit 503. The speaker/microphone configuration may be configured with Push-To-Talk capability and Voice over IP (VoIP) capability.

Processing unit 503 may include an encoder/decoder 511 with an associated code ROM 512 for storing data for encoding and decoding voice, data, control, or other signals that may be transmitted or received by radio 102. Processing unit 503 may further include a microprocessor 513 coupled, by the common data and address bus 517, to the encoder/decoder 511, a character ROM 514, a RAM 504, and a static memory 516. The processing unit 503 may also include a digital signal processor (DSP) 519, coupled to the speaker 520, the microphone 521, and the common data and address bus 517, for operating on audio signals received from one or more of the communications unit 502, the static memory 516, and the microphone 521.

Communications unit 502 may include an RF interface 509 configurable to communicate with network components, and other user equipment within its communication range. Communications unit 502 may include one or more broadband and/or narrowband transceivers 508, such as an Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver perhaps operating in accordance with an IEEE 802.16 standard, and/or other similar type of wireless transceiver configurable to communicate via a wireless network for infrastructure communications. Communications unit 502 may also include one or more local area network or personal area network transceivers such as Wi-Fi transceiver perhaps operating in accordance with an IEEE 802.11 standard (e.g., 802.11a, 802.11b, 802.11g), or a Bluetooth transceiver. The transceivers may be coupled to a combined modulator/demodulator 510 that is coupled to the encoder/decoder 511.

The character ROM 514 stores code for decoding or encoding data such as control, request, or instruction messages, channel change messages, and/or data or voice messages that may be transmitted or received by radio 102. Static memory 516 may store operating code for performing one or more of the steps set forth in FIG. 6.

Figure 6:
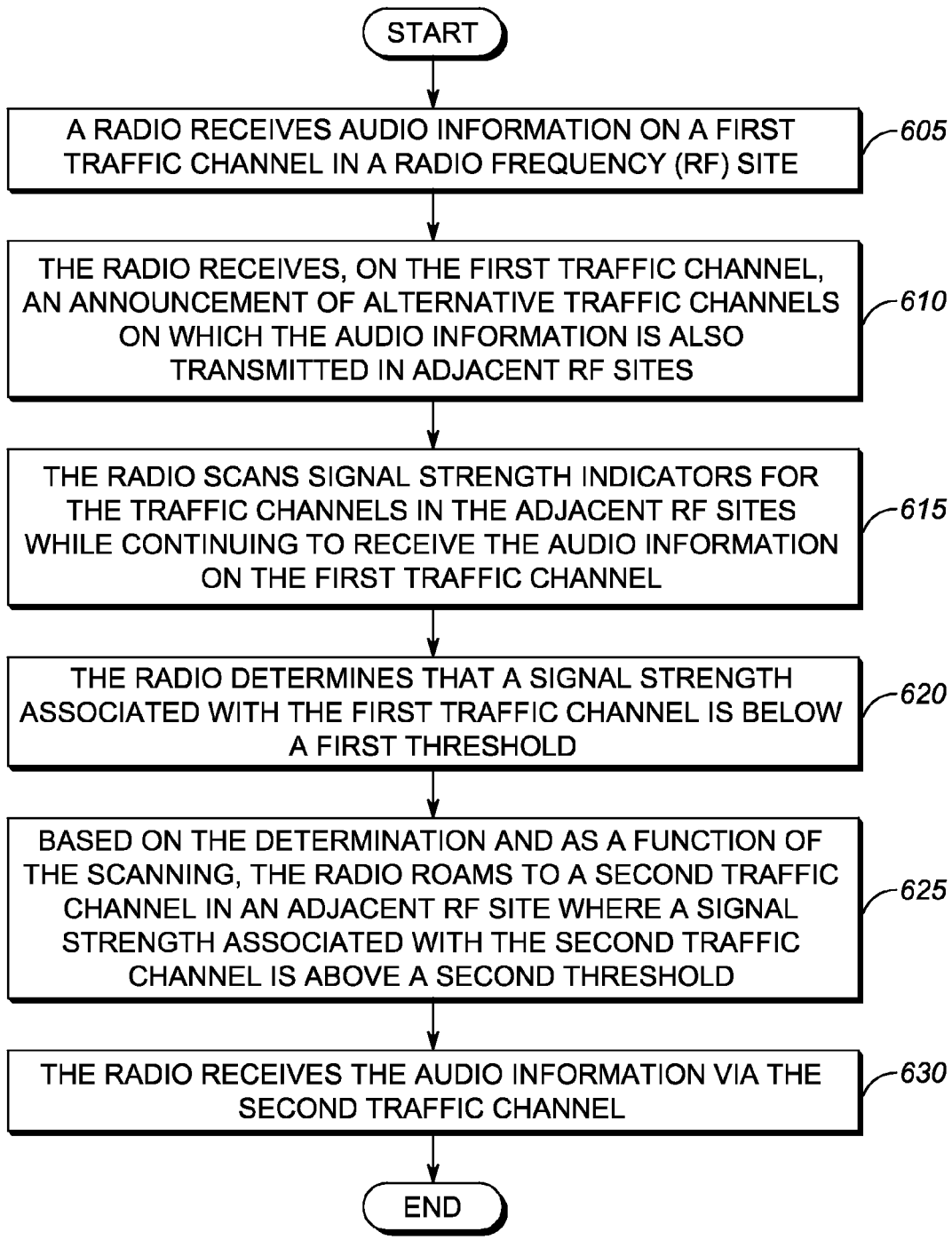
FIG. 6 is a flow diagram of the steps implemented in accordance with some embodiments.

FIG. 6 is a flow diagram of steps implemented in accordance with some embodiments. At 605, a radio receives audio information of a call on a first traffic channel in a radio frequency (RF) site. At 610, the radio receives, on the first traffic channel, an announcement of alternative traffic channels on which the audio information is also transmitted in adjacent RF sites. At 615, the radio scans signal strength indicators for one or more of (or all of) the alternative traffic channels in the adjacent RF sites while continuing to receive the audio information on the first traffic channel. At 620, the radio determines that a signal strength associated with the first traffic channel is below a first threshold. At 625, based on the determination and as a function of the scanning, the radio roams to a second traffic channel, selected from the alternative traffic channels, in an adjacent RF site where a signal strength associated with the second traffic channel is above a second threshold. The radio roams to the second traffic channel in the adjacent RF site without tuning to the control channel of the adjacent RF site and waiting for traffic channel announcements on that control channel. At 630, the radio receives the audio information of the call via the second traffic channel.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
   receiving, by a radio, audio information of a call on a first traffic channel in a radio frequency (RF) site;
   receiving, by the radio on the first traffic channel, an announcement of alternative traffic channels in adjacent RF sites, on which the audio information is also being transmitted;
   scanning, by the radio, signal strength indicators for one or more of the alternative traffic channels in the adjacent RF sites while continuing to receive the audio information on the first traffic channel;
   determining, by the radio, that a signal strength associated with the first traffic channel is below a first threshold;
   based on the determination and as a function of the scanning, roaming, by the radio, to a second traffic channel, selected from the alternative traffic channels, in an adjacent RF site where a signal strength associated with the second traffic channel is above a second threshold; and
   receiving, by the radio, the audio information of the call via the second traffic channel.

2. The method of claim 1, wherein the announcement is embedded in at least one link control message received with the audio information and the announcement includes a channel identifier, a slot identifier and a delay period of each of the traffic channels in the adjacent RF sites.

3. The method of claim 1, wherein the announcement is received in a broadcast message, wherein the broadcast message includes a channel identifier, a slot identifier and a delay period of each of the traffic channels in the adjacent RF sites.

4. The method of claim 1, wherein the scanning includes scanning a signal strength indicator of each of the alternative traffic channels in the adjacent RF sites to identify those alternative traffic channels in the adjacent RF site with the signal strength indicator above the second threshold.

5. The method of claim 1, wherein the scanning includes scanning the alternative traffic channels in the adjacent RF sites during at least one timeslot when the radio is not receiving the audio information.

6. The method of claim 1, wherein the roaming comprises roaming to the second traffic channel in the adjacent RF site and synchronizing with the second traffic channel in the adjacent RF site without using the control channel in the adjacent RF site.

7. The method of claim 1, wherein the roaming comprises roaming to the second traffic channel in the adjacent RF site in accordance with delay information associated with the second traffic channel at the adjacent RF site and delay information associated with the first traffic channel at a home RF site.

8. The method of claim 1, further comprising obtaining control channel information for the adjacent RF site by monitoring an announcement including a site identifier for the adjacent RF site sent by the second traffic channel.

9. The method of claim 1, further comprising registering with a control channel on the adjacent RF site when a call on the second traffic channel ends.

10. The method of claim 1, wherein the alternative traffic channels information of the adjacent RF sites is present on an outbound traffic channel at least one of during the transmission and at the end of the transmission.

11. A radio comprising:
a memory configured to store information about adjacent radio frequency (RF) sites;
a transceiver; and
a processor configured to:
  receive, via the transceiver, audio information of a call on a first traffic channel in a radio frequency (RF) site and receive, on the first traffic channel, an announcement of alternative traffic channels in adjacent sites on which the audio information is also being transmitted;
  scan, via the transceiver, signal strength indicators for one or more of the alternative traffic channels in the adjacent RF sites while continuing to receive the audio information on the first traffic channel;
  determine that a signal strength associated with the first traffic channel is below a first threshold;
  based on the determination and as a function of the scanning, roam to a second traffic channel, selected from the alternative traffic channels, in an adjacent RF site where a signal strength associated with the second traffic channel is above a second threshold; and
  receive, via the transceiver, the audio information of the call via the second traffic channel.

12. The radio of claim 11, wherein the announcement is embedded in at least one link control message received with the audio information and the announcement includes a channel identifier, a slot identifier and a delay period of each of the traffic channels in the adjacent RF sites.

13. The radio of claim 11, wherein the announcement is received in a broadcast message, wherein the broadcast message includes a channel identifier, a slot identifier and a delay period of each of the traffic channels in the adjacent RF sites.

14. The radio of claim 11, wherein the processor is configured to scan a signal strength indicator of each of the alternative traffic channels in the adjacent RF sites to identify those alternative traffic channels in the adjacent RF sites with the signal strength indicator above the second threshold.

15. The radio of claim 11, wherein the processor is configured to scan the alternative traffic channels in the adjacent RF sites during at least one timeslot when the radio is not receiving the audio information.

16. The radio of claim 11, wherein the processor is configured to roam to the second traffic channel in the adjacent RF site and synchronize with the second traffic channel in the adjacent RF site.

17. The radio of claim 11, wherein the processor is configured to roam to the second traffic channel in the adjacent RF site in accordance with delay information associated with the second traffic channel at the adjacent RF site and delay information associated with the first traffic channel at a home RF site.

18. The radio of claim 11, wherein the processor is configured to obtain control channel information for the adjacent RF site by monitoring an announcement including a site identifier for the adjacent RF site sent by the second traffic channel.

19. The radio of claim 11, wherein the processor is configured to register with a control channel on the adjacent RF site when a call on the second traffic channel ends.

20. The radio of claim 11, wherein the alternative traffic channels information of the adjacent RF sites is present on an outbound traffic channel one of during the transmission and at the end of the transmission.

* * * * *